United States Patent [19]

Long et al.

[11] Patent Number: 5,325,519

[45] Date of Patent: Jun. 28, 1994

[54] FAULT TOLERANT COMPUTER WITH ARCHIVAL ROLLBACK CAPABILITIES

[75] Inventors: Donald W. Long; Charles D. Hultgren, both of Sugarland, Tex.

[73] Assignee: Texas Microsystems, Inc., Houston, Tex.

[21] Appl. No.: 779,397

[22] Filed: Oct. 18, 1991

[51] Int. Cl.⁵ ............................................. G06F 11/00
[52] U.S. Cl. ........................................ 395/575; 371/13
[58] Field of Search .................. 395/575; 364/268.1, 364/268.5, 285.1, 943.92, 944.1, 944.2, 245.3, 970.1; 371/10.1, 12, 13

[56] References Cited

U.S. PATENT DOCUMENTS

| | | | |
|---|---|---|---|
| 4,878,167 | 10/1989 | Kapulka et al. | 364/200 |
| 4,996,687 | 2/1991 | Hess | 371/10.1 |
| 5,086,502 | 2/1992 | Malcolm | 395/575 |
| 5,138,710 | 8/1992 | Kruesi et al. | 395/575 |

OTHER PUBLICATIONS

Kohler, Walter H., "Overview of Synchronization and Recovery Problem in Distributed Data Bases", IEEE, 1980, pp. 433-441.

Crus, R. A., "Data Recovery in IBM Database 2", IBM System Journal, vol. 23, No. 2, 1984 pp. 178-188.

Primary Examiner—Robert W. Beausoliel, Jr.
Assistant Examiner—Ly V. Hua
Attorney, Agent, or Firm—Vinson & Elkins

[57] ABSTRACT

A computer system comprises a storage device comprising a plurality of locations for storing data and having a defined audit partition region comprising one or more of said locations and processing circuitry for detecting access requests to alter data on respective sets of one or more of locations of the storage device. Responsive to each access request, the processing circuitry stores data from said respective set of locations in the audit partition region prior to performing the access request, such that a sequence of data transfers from the storage device is stored in the audit partition region in a known order. Responsive to a user request, data is restored from the sequence of data transfers in the audit partition region to the respective set of locations on the storage device to return the storage device to a previous state.

46 Claims, 2 Drawing Sheets

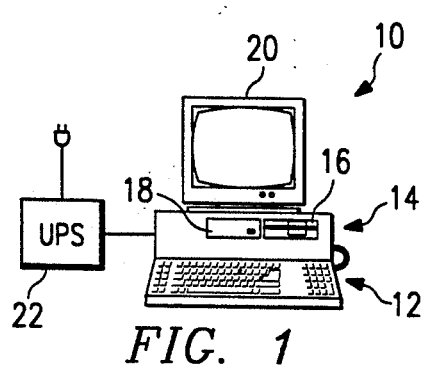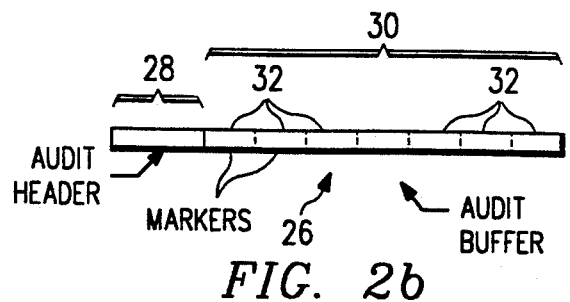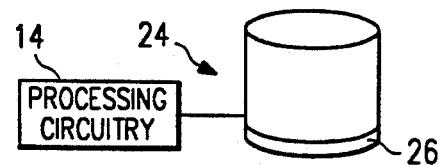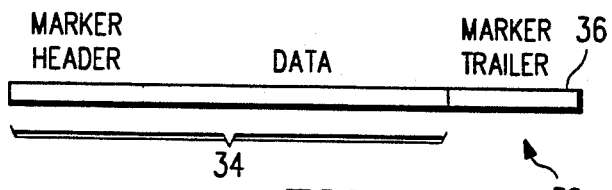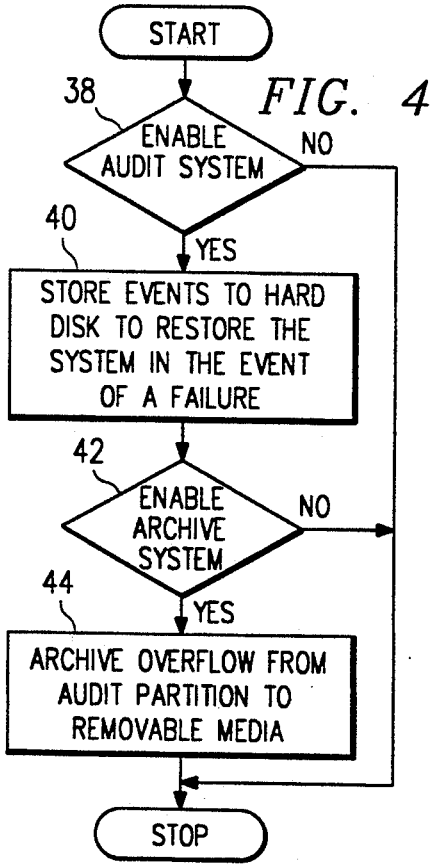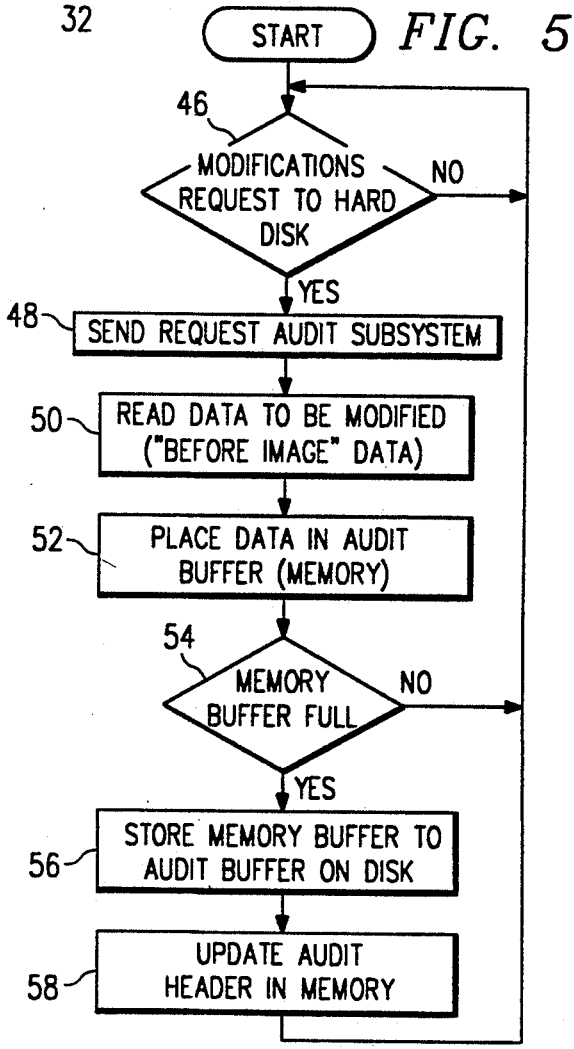

FAULT TOLERANT COMPUTER WITH ARCHIVAL ROLLBACK CAPABILITIES

TECHNICAL FIELD OF THE INVENTION

This invention relates in general to computers, and more particularly to a fault tolerant computer.

BACKGROUND OF THE INVENTION

Over the last decade, the use of small computer systems, typically referred to as "personal computers" or "workstations", have been used increasing for significant commercial applications. The data processed on the computers may be extremely important to a company and faulty data and faults in the computers inevitably lead to unacceptable disruptions of operations, financial loss, or data loss in critical PC applications.

A fault tolerant architecture provides a system with redundant resources. If one resource fails, another can be assigned in its place giving the ability to continue processing the application without disruption, or with minimal disruption. The goal of fault tolerant design is to improve dependability by enabling a system to perform its intended function in presence of a given number of faults. A fault tolerant system is not necessarily highly dependable, nor does high dependability necessarily require fault tolerant. The deterministic goal for a fault tolerant system is that no single fault can cause system failure.

Error recovery is an important aspect of a fault tolerant system. "Error recovery" is correction of the system to an acceptable state for continued operation. System recovery schemes restore system operation to a previous correct state or a recovery point. For example, a processor is rolled back to a recovery point by restoring registers and memories to the saved state and invalidating cache memories, forcing cache data to be restored from disk.

Database Management Systems (DBMSs) use a form of error recovery in relation to transactions. A transaction is a series of processing steps having a beginning and an end. A transaction may be "committed" (made permanent) or "aborted" (records in database returned to original state). At least one DBMS allows a user to rollback a number of transactions.

One important aspect of error recovery is recovery of data on a hard disk or other mass storage medium after a failure. A typical failure could include a power outage during a write operation in which the new data has been only partially written to the hard disk and the previous data has been partially overwritten to the write operation, or by an operator error causing faulty data to be written to the hard disk. In either case, the user may wish to return to a previous known state to continue the application.

Therefore, a need has arisen in the industry for a fault tolerant system having an effective and cost efficient method of recovering from an error affecting the hard disk drive.

SUMMARY OF THE INVENTION

In accordance with the present invention, a fault tolerant computer system is provided which includes significant improvements in hard disk error recovery.

The computer system of the present invention includes a mass storage device having a defined audit partition region. Processing circuitry detects accesses to the device which would alter data thereon, and stores the data to be altered in the audit partition region for later restoration.

In one embodiment of the present invention, the audit partition includes an audit header region and an audit buffer region. The audit header region contains information on the configuration of the audit buffer region and the audit buffer region contains information relating to system events. The system events may include, but are not limited to, a start condition (for enabling the audit subsystem), power on and power failure, reboot, quiesce (a user invoked marker for indicating a desired hard disk state) and audit (data changes).

The present invention provides a efficient, reliable and cost effective architecture for disk fault tolerance.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 illustrates a diagram of the computer system hardware of the present invention;

FIGS. 2a-b illustrate a diagrammatic representations of allocation of the hard disk and the audit partition defined therein;

FIG. 3 illustrates a representation of audit marker;

FIG. 4 illustrates a flow diagram user configuration of the audit subsystem;

FIG. 5 illustrates a flow diagram of a modification request;

DETAILED DESCRIPTION OF THE INVENTION

Figure 6:
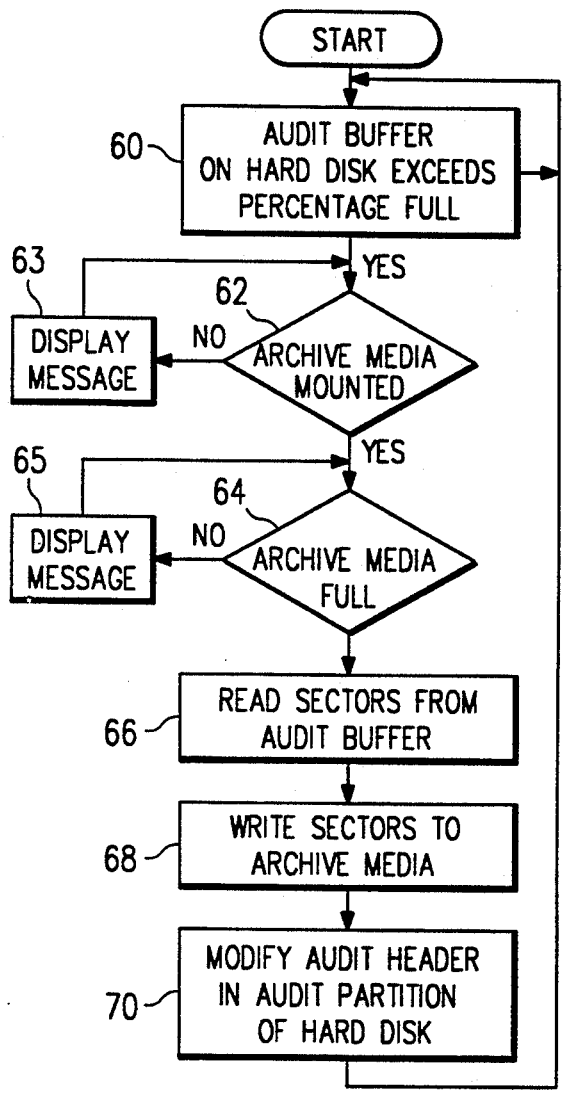
FIG. 6 illustrates a flow diagram of the archive procedure.

The preferred embodiment of the present invention and its advantages are best understood by referring to FIGS. 1-8 of the drawings, like numerals being used for like and corresponding parts of the various drawings.

FIG. 1 illustrates a representation of the preferred embodiment of the present invention. A computer system 10 comprises an input device such as a keyboard 12, a processing unit 14, floppy drives 16 (or other removable media device) and one or more hard disks 18 (or other mass storage device). Output from the processing unit 14 is displayed on a monitor 20. In the preferred embodiment, a uninterruptable power supply (UPS) 22 is coupled between the processing unit 14 and the power supply to provide interim power in the event of a power outage. Also, the computer system 14 uses two power supplies (not shown), so that a backup power supply is always available.

The goal of a fault tolerant computer system is to provide the system with redundant resources such that failure of one resource will not significantly disrupt the continued processing of an application. A fault tolerant system design must consider performance, complexity, cost, size, and other constraints, which will be affected by the redundancy and fault tolerance strategies used. A fault tolerant strategy may include one or more of the following elements: error detection and masking, error containment, error recovery, diagnosis, and repair/reconfiguration. These concepts are described below:

ERROR DETECTION AND MASKING

The detection of an error or its symptoms during the normal operation of the system is the cornerstone to fault tolerant architectures. The component complexity affects the ability to distinguish errors from correct values. Errors occurring in data-storage components, such as registers and memory, or during data transmission via buses or network links, are more easily detected than errors originating within modules that generate or transform data. The following methods are used for error detection and/or masking:

1. Module replication for error detection and masking.
2. Protocol and timing checks.
3. Error detection and correction codes (ECC).
4. Error detection parity check codes.
5. Self-checking logic (i.e., voting logic).

Masking or correcting errors is more difficult, but can be concurrent with normal system operations. Coding theory is the most widely developed mechanism for error detection and correction in digital systems, typically requiring less redundancy than other error detection and correction schemes.

ERROR CONTAINMENT

Error containment is the prevention of an error propagating across defined boundaries in the system. To protect critical system resources and minimize recovery time, errors must be confined to the module in which they originated. Typically, error containment boundaries are hierarchically defined, with errors confined at the lowest possible level to a replaceable module.

ERROR RECOVERY

The correction of the system to a state acceptable for continued operation is known as "error recovery". Most system recovery schemes restore system operation to a previous correct state or recovery point. A processor is rolled back to a recovery point by restoring registers and memories to the saved state and invalidating cache memories, forcing cached data to be restored from disk.

In loosely-coupled systems, spare processors are periodically updated at predefined checkpoints defining a restart point. When a spare is given control of the task after the master processor has failed, processing will continue from the restart point rather than the beginning of the task.

DIAGNOSIS

After an error has occurred and been recovered, the user must be informed, or given the diagnosis. The diagnosis will give the user an identification of the faulty module responsible for a detected error condition in the system so the module may be repaired or replaced.

REPAIR/RECONFIGURATION

Elimination or replacement of a faulty component or a mechanism for bypassing it during normal operation is necessary for a totally fault tolerant configuration. Many reconfiguration strategies use all system components to perform useful work. When a fault occurs, system performance is degraded by redistributing the work load among the remaining resources. Another alternative is to reduce system redundancy, affecting subsequent fault tolerance.

Replacement units can be added to the system either "hot" or "cold". A hot spare concurrently performs the same operations as the module it is to replace, needing no initialization when it is switched into the system. A cold spare is either not powered or used for other tasks, requiring initialization when switched into the system. The "cold" spare philosophy will generally have a lower hardware cost and will therefore be preferred in many situations.

An important aspect of a fault tolerant computer system is its ability to return to a previous known state after a failure. In particular, the data on the hard disk is frequently changed during operation of an application program or by the operating system. A system failure may result in valuable information being lost or corrupted.

FIG. 2a illustrates a diagrammatic view of the allocation of the hard disk 18. Hard disks frequently are comprised of several platters with recording media on each side although some hard disks comprise a single platter. While the hard disk is typically a magnetic media, other technologies such as optical disks may also incorporate the invention as provided herein.

In FIG. 2a, the disk 24 is shown having a audit partition region 26. The audit partition 26 is a portion of the hard disk that is reserved for use by the audit subsystem. Typically, the audit partition will comprise at least 2% of the hard disk's capacity.

As shown in FIG. 2b, the audit partition 26 is used to keep track of the audit environment and to store certain selected events that occur within the system. The audit partition 26 is made up of two sections: the audit header 28 and the audit buffer 30. The audit header 28 contains information that is used to manage the audit buffer 30, archive media (described hereinbelow) and the general environment of the audit subsystem. The audit buffer stores the events which are used to restore the system to a previous state in the event of a failure. The audit buffer 30 is a circular buffer where audit markers (see FIG. 3) are stored. Events and data are stored in the audit buffer 30 using the audit marker format. In the preferred embodiment, the audit partition is structured as series of disk sectors; the first disk sector contains the audit header 28 and the following sectors contain the audit buffer 30.

The audit header is comprised of a number of fields, defined in Table 1. The information in these fields is used to control the way the audit buffer 30 is configured and processed.

TABLE 1

| Audit Header Fields | |
|---|---|
| Data Label | Data Description |
| Ver | The version of the audit system that created the audit partition. |
| Name | A name to assist in determining that the audit partition is valid. |
| HdrSeqNum | Sequence number that is used every time the header is written to disk. |
| Time | The time the audit partition was created or reset (cleared out). |
| CloseErr | The last audit error. This is used to determining if a failure occurred and the system came down before the audit |

TABLE 1-continued

Audit Header Fields

| Data Label | Data Description |
|---|---|
| | header was updated on the hard disk(s). |
| SeqNum | The next Archive disk sequence number to use. |
| QSeqNum | The last archive disk that contains a user quiescence marker. |
| Flush | A note to the system that the audit header needs to be written to disk at the next available opportunity (used in memory only). |
| LabelLoc | The physical location of the label on disk (audit header). |
| BufLoc | The physical location of the beginning of the audit buffer on disk. |
| CacheLoc | The current location of the audit buffer in the disk cache. |
| CLoc | The physical location of the last data in the buffer. The next update of the buffer will begin at this address. This is on a sector by sector basis. |
| CLocBytes | Current offset in the current sector that we are at (see CLoc). |
| MaxSectors | The number of sectors that make up the audit buffer. This does not include the first sector that contains the audit header. |
| MaxUsable | When the audit buffer gets to this point the archive system will start archiving. |
| MinUsable | When the audit buffer gets to this point the archive system will stop archiving. |
| UsedSectors | The number of sectors that have been used in the audit buffer. |
| CurSector | The logical sector number currently in use by the audit buffer. |
| FirstMarker | The contents of the first marker header. |
| FirstMarkerLoc | The location of the first marker in the audit buffer. |
| FirstMarkerOffset | The offset in the sector that contains the first marker. |
| FirstMarkerSector | The logical sector that contains the first marker. |
| LastMarker | The contents of the last marker header. |
| LastMarkerLoc | The last marker location in the audit buffer. |
| LastMarkerOffset | The offset in the sector that contains the last marker. |

The audit buffer 30 is used to record events such as writes to the hard disk(s), power failure, power on and system reboot. Events are further described in Table 4. Each event is captured in audit marker, shown in FIG. 3. The audit marker 32 comprises a marker header 34 and a marker trailer 36. The marker header is used to describe the type of event and time it occurred. If any data is captured, it is appended to the marker header 34. The marker header fields are shown in Table 2.

TABLE 2

Marker Header Fields

| Data Label | Data Description |
|---|---|
| Event (State) | The type of event that occurred. |
| Marker CRC | The Cyclic Redundancy Check (CRC) of the marker. |
| Time | The time the event occurred. |
| Rcb | The location on the hard disk that the data came from, if applicable. |
| MsgLen | The length of the optional text string associated with the marker. |
| MsgData | An optional text string associated with the marker. If the event is an audit event of MsgLen = 0, this field is empty. This text field allows the user to create a quiesce mark with notes about the mark for alter reference. |
| SectorData | The data that was read from the hard disk at location Rcb. If the event is not an audit event, this field is empty. |

The marker trailer 36 is used to access the audit buffer 30 in reverse order. The marker trailer 36 contains the type of event and other information required to determine the location of the marker header. The marker trailer fields are given in Table 3.

TABLE 3

Marker Trailer

| Data Label | Data Description |
|---|---|
| Event (State) | The type of event that occurred. |
| MsgLen | The length of the optional text string associated with the marker. |
| Marker CRC | The Cyclic Redundancy Check (CRC) of the marker. |

The audit partition may be used to store information relating to any number of events. The events supported in the preferred embodiment are described in connection with Table 4. The computer system 10 provides circuitry for generating the appropriate signals responsive to the events. For example, the power supply generates a signal when AC power is lost, even though the UPS will continue to operate the computer system 10. Also, the interrupt for a system reboot is captured and stored prior to performing the reboot.

TABLE 4

Events

| Event Type | Event Description |
|---|---|
| Start | The start of the audit buffer. This will only occur when the audit partition is created or when the audit buffer is reset (cleared). |
| Continue | If the archive part of audit clears the audit buffer out completely then this event is placed in the audit buffer. |
| Audit | This event occurs when the data on the hard disk(s) is changed. The event contains the data that existed on one sector of the disk prior to the write occurring. |
| Nop | A general filler event. |
| PowerOn | The system detected a power on. Power was off and has returned. |
| PowerFail | The system detected a power failure. Power was on but AC was lost. |
| Reboot | The system was rebooted. |
| Quiesce | The user or an application requested the system to place a marker in the audit buffer at this time. |

The audit subsystem works in the background, with no user impact. The audit subsystem may be enabled or disabled by the user. The system is considered "on-line" if the audit subsystem is enabled. In the preferred embodiment, the audit subsystem is part of the system BIOS (Basic Input/Output System), but could also be a memory-resident program.

The user has several options for the use of the on-line system:
  1. Whether or not to enable the audit subsystem.
  2. If the audit subsystem is enabled, whether or not to enable archiving.

3. If the archiving subsystem is enabled, when (defined as a percentage of the available audit storage space) to begin archiving data to removable media.

FIG. 4 illustrates a flow chart describing user configuration of the audit subsystem. In decision block 38, the user decides whether or not to enable the audit system. If the audit system is enabled, then it will store events to the hard disk to restore the system in the event of a failure (block 40). Otherwise, if the audit system is not enabled, the hard disk operation will be normal. If the audit system is enabled, the user has the option to enable the archive subsystem in decision block 42. The archive subsystem stores overflow information from the audit partition onto a removable media, such as a floppy disk. This option increases the opportunity to rollback the state of the hard disk to a previous state (block 44). The archive subsystem can only be chosen if the audit system is enabled. The selection of when data will be written to the removable media is preferably defined in percentages of the audit storage space (i.e., the size of the audit partition 26). For example, typical values for start and stop writing would be at 80% and 50%, respectively. Thus, the process of writing archive data to the removable media would begin when the audit subsystem has filled 80% of the audit buffer 30 and stop when 50% of the audit buffer 30 was available.

A "modification request" is a request from an application to modify the contents of the hard disk. FIG. 5 is a flow chart describing the sequence of operations performed by the audit subsystem in response to a modification request. In decision block 46, the audit subsystem waits until a modification request is generated. When the computer system 10 needs to write to a hard disk 18, the request is sent to the audit subsystem (block 48) before the data on the disk is modified (assuming audit is enabled). The data to be modified on the disk is read one sector at a time (block 50). Each sector is read from the disk (or from a disk cache, if provided) and is placed in the audit buffer as "before image" data (block 52). If the application requests a write that is more than one sector, each sector is processed as an independent request. To increase the throughput of the audit subsystem, the audit subsystem appends data to a semiconductor memory buffer prior to writing the data to the audit partition on the hard disk, which is significantly slower. When the memory buffer is full (decision block 54), or the processing unit 14 requires memory used in the memory buffer for another purpose, the audit subsystem writes the data stored in the memory buffer to the end of the audit buffer 30 on disk (block 56) and updates the audit header (in the memory buffer) to reflect the changes (block 58).

While a memory buffer is provided in the preferred embodiment, the data could also be written directly to the audit partition 26 on the hard disk with a reduction in speed. For purposes of data integrity, a volatile memory buffer should not be used unless a UPS is provided.

Storage of the data in the memory buffer is performed in three stages. The marker header 34 is created and stored in the memory buffer. If sector data is stored, it is added to the marker header. Finally, the marker trailer 36 is stored. The complete operation creates the marker 32.

The system constructs the audit header from the type of marker (corresponding to the type of event), the markers' CRC, the current system time, and the location that the sector data is from on the hard disk. The CRC is generated by passing part of the marker through a CRC algorithm:

$$x+(x*2),$$

where x is a word from the marker.

The sections of the marker that are passed through the algorithm are, in the following order: the seed from the previous marker (29,878 is used as the seed if the partition is created or cleared), the sector data (if the marker corresponds to an audit event), one word at a time, the time the marker is processed through the algorithm and any message test (for quiesce events).

After all of the sectors of the write request have been processed, the audit subsystem returns control back to the processing unit 14 and allows it to modify the hard disks 18 with the requested write.

It should be noted that all data is written out to the physical disk before any of the actual data is. This is done by having the memory buffer semaphored. When another part of the computer system 10 needs to write data to the hard disk, it will flush the memory buffer that contains the audit markers to the physical disk. This is required for rollback to work, since the "before image" of the data must be captured on the physical disk before the actual data is modified. The reason for the buffer is to cut down the number of I/Os to the physical disk.

If the audit buffer becomes full, and the configuration has the archive subsystem enabled, then the audit system will send a message to the display 20 that the audit buffer 30 is full. At this point, the user may respond to the request for archive media for external storage. A flow chart of the operation of the archive subsystem is shown in FIG. 6.

Archiving of the audit buffer 30 occurs at predetermined intervals (for example, every five seconds). When a five second ticker is enabled and the system has determined that it needs to archive, one track's data (the size of the track is dependent upon the structure of the archive media) is prepared and then stored on archive media. This system allows the archiving to take place in the background so that the user may continue processing during an archive operation. The archive is asynchronous to the rest of the system. During the time that the archive system actually writes to the archive media, the system response will be somewhat slower; however, the user only needs to intervene for archive mounts and media changes.

Referring to FIG. 6, in decision block 60, it is determined whether the audit buffer 30 on the hard disk exceeds the predetermined percentage for a full disk. If so, it is determined whether archive media is mounted in decision block 62; if not, a message is displayed (block 63) until the archive media is mounted. Once the archive media is mounted, it is determined whether the archive media is full in decision block 64. If full, a message is displayed (block 65) until a new media is mounted which is not full. If the user chooses not to provide an archive media, the audit system is turned off and a error message is displayed (alternatively, the audit buffer could be made circular to overwrite the oldest saved data, as is done when archiving is not selected). In block 66, a predetermined number of sectors are read from the audit buffer. In the preferred embodiment, twenty sectors are read. The number of sectors could be less if there are not twenty sectors currently in use. The archive subsystem then finds the starting position in the first sector from the marker. It will then run down the markers in memory until eighteen sectors of markers are read. At this point, it will make room to place a marker, called an "archive end", at the end of the list. The archive end marks the end of the archive track that is to be written. The track is then written to the archive media in block 68. After the write is completed, the audit header in memory is modified to show the removal of the audit markers from the audit buffer 30.

In the event of a failure, the audit partition 26 and any archive media allow rollback of the state of the hard disk to a previous known state. The rollback function is separate on-line audit system. Typically, rollback is performed via a utility program that accesses the on-line system. Flow charts outlining the rollback step are provided in FIGS. 7 and 8.

Figure 7:
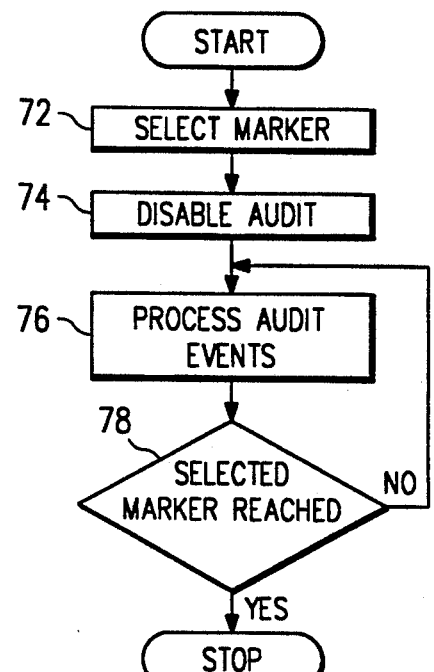
FIG. 7 illustrates a flow diagram of the rollback procedure.

In FIG. 7, the user selects a marker designating a prior desired state in block 72. The markers are contained in the audit buffer, and may be used to replay the history of the hard disk in reverse order. The history comprises the time and date of each event; typically, audit events are not displayed as part of the history. From the history, the user may select a time to which the state of the hard disk will be restored. The only events that are replayed are audit events (the events that capture the before image data). The other events are used by the user to determine the time to which the hard disk is to be restored.

Once a marker is selected, the audit state is disabled in block 74 and the interim audit events are processed in reverse order until the selected marker is reached (blocks 76 and 78).

Figure 8:
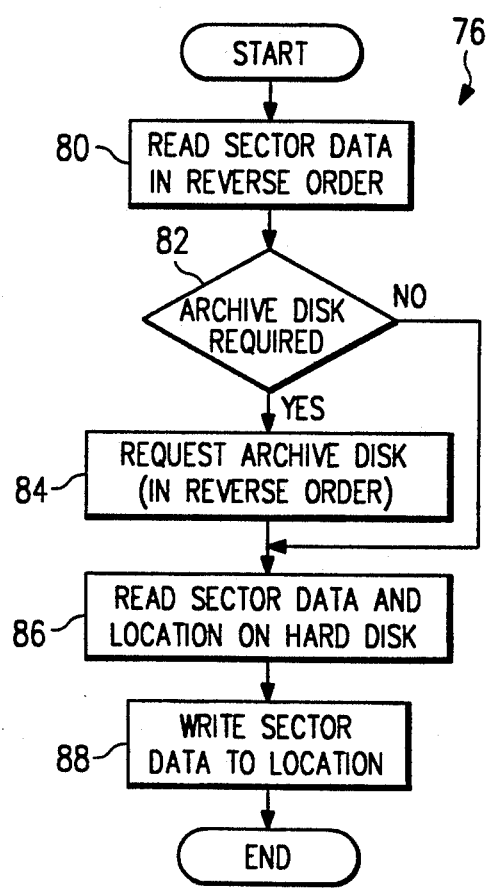
FIG. 8 illustrates a flow diagram of the process audit event block of the flow diagram of FIG. 7.

FIG. 8 illustrates a flow diagram describing the steps of block 76 of FIG. 7. In processing the audit events, sector data is read in reverse order (block 80). If archive disk is required in decision block 82, then the disk or disks are requested in reverse order in block 84. In block 86, the sector data and its associated location on the hard disk (the location the data occupied prior to transfer to the audit buffer) are read from the appropriate media, audit buffer 30 or archive disk. The sector data is then written to the respective location in block 88. The process audit events steps are repeated until the selected marker is reached. At that point, the hard disk has been restored to the selected rollback point. After rollback is thus completed, and the user exits the utility, the utility will reboot the operating system. After the operating system is loaded, the hard disks will contain the data as of the time of the selected rollback point. All other data that had been stored on the disk after the rollback point will have been removed and replaced with the previous data.

The present invention is applicable to any mass storage media wherein old data may be overwritten with new data. While the mass media described herein is described as a "disk", it should be noted that other structures, such as a drum structure, could similarly be used without affecting the applicability of the present invention. Further, it should be noted that while the mass storage media typically remains with the computer system 10, the present invention may be used with removable media as well.

In contrast to DBMS transaction rollbacks, the present invention provides an audit trail based on a data stream and system events which occur during the data stream, independent of how the data is structured or of the beginning or end of a transaction. This provides the ability to efficiently rollback data to a desired state responsive to a failure.

Although the present invention and its advantages have been described in detail, it should be understood that various changes, substitutions and alterations can be made herein without departing from the spirit and scope of the invention as defined by the appended claims.

What is claimed is:

1. A computer system comprising:
   a storage device comprising a plurality of locations for storing data and having a defined audit partition region comprising one or more of said locations; and
   processing circuitry for:
      detecting access requests to alter data on respective sets of one or more of locations of the storage device;
      responsive to each access request, storing data from said respective set of locations in the audit partition region prior to performing the access request, such that a sequence of data transfers from the storage device is stored in the audit partition region in a known order; and
      responsive to a user request, restoring data from the sequence of data transfers in the audit partition region to the respective set of locations on the storage device to return the storage device to a previous state.

2. The computer system of claim 1 wherein said partition region comprises an audit header region and an audit buffer region.

3. The computer system of claim 2 wherein said storage device has a defined configuration and said audit header region contains information about the configuration of the audit buffer region.

4. The computer system of claim 2 wherein said audit buffer region contains event information relating to system events.

5. The computer system of claim 4 wherein said event information comprises one or more audit markers, each audit marker comprising a marker header specifying a type for the event and a time at which the event occurred and a marker trailer providing information for determining the location of the marker header.

6. The computer system of claim 5 wherein the marker header further comprises the data to be altered.

7. The computer system of claim 1 wherein said processing circuitry transfers data from the audit buffer to removable media.

8. The computer system of claim 7 wherein said processing circuitry transfers data to said removable media responsive to a predetermined percentage of said audit buffer being full.

9. The computer system of claim 8 wherein said processing circuitry transfers data from said audit buffer until a predetermined percentage of the audit buffer is available for new data.

10. The computer system of claim 1 wherein said processing circuitry transfers data from the audit buffer to the storage device to return the storage device to a previous state.

11. The computer system of claim 1 wherein said processing circuitry detects system events and stores information regarding the events in the audit partition region.

12. The computer system of claim 11 and further comprising circuitry to generate a signal responsive to an event of enabling power to the computer system.

13. The computer system of claim 11 and further comprising circuitry to generate a signal responsive to an event of power failure to the system.

14. The computer system of claim 11 and further comprising circuitry to generate a signal responsive to a user input defining a desired state of the computer system.

15. The computer system of claim 11 and further comprising circuitry to generate a signal responsive to a system reboot.

16. A storage device subsystem for providing rollback to a previous desired state, comprising:
a storage medium comprising a plurality of locations for storing data and having a defined audit partition region comprising one or more of said locations; and
processing circuitry for:
detecting access requests to alter data on respective sets of one or more of said locations of the storage device;
responsive to each access request, storing data from said respective set of locations in the audit partition region prior to performing the access request, such that a sequence of data transfers from the storage device is stored in the audit partition region in a known order; and
responsive to a user request, restoring data from said audit partition region to said storage device responsive to a user request to return the storage device to a previous state.

17. The storage device subsystem of claim 16 wherein said partition region comprises an audit header region and an audit buffer region.

18. The storage device subsystem of claim 17 wherein said storage device has a defined configuration and said audit header region contains information about the configuration of the audit buffer region.

19. The storage device subsystem of claim 17 wherein said audit buffer region contains event information relating to system events.

20. The storage device subsystem of claim 19 wherein said event information comprises one or more audit markers, each audit marker comprising a marker header specifying a type for the event and a time at which the event occurred and a marker trailer providing information for determining the location of the marker header.

21. The storage device subsystem of claim 20 wherein the marker header further comprises the data to be altered.

22. The storage device subsystem of claim 16 wherein said processing circuitry transfers data from the audit buffer to removable media.

23. The storage device subsystem of claim 22 wherein said processing circuitry is transfers data to said removable media responsive to a predetermined percentage of said audit buffer being full.

24. The storage device subsystem of claim 23 wherein said processing circuitry is further transfers data from said audit buffer until a predetermined percentage of the audit buffer is available for new data.

25. The storage device subsystem of claim 16 wherein said processing circuitry is transfers data from the audit buffer to the storage medium to return the storage device to a previous state.

26. The storage device subsystem of claim 16 wherein said processing circuitry detects system events and stores information regarding the events in the audit partition region.

27. The storage device subsystem of claim 26 and further comprising circuitry to generate a signal responsive to an event of enabling power to the computer system.

28. The storage device subsystem of claim 26 and further comprising circuitry to generate a signal responsive to an event of power failure to the system.

29. The storage device subsystem of claim 26 and further comprising circuitry to generate a signal responsive to a user input defining a desired state of the computer system.

30. The storage device subsystem of claim 26 and further comprising circuitry to generate a signal responsive to a system reboot.

31. A method of providing rollback of data on a storage device comprising a plurality of locations for storing data to a previous desired state, comprising the steps of:
defining an audit partition region on the storage device comprising one or more of the locations;
detecting access requests to alter data on respective sets of one or more of said locations of the storage device;
responsive to each access request, storing data from said set of locations in the audit partition region prior to performing the access request, such that a sequence of data transfers from the storage device is stored in the audit partition region in a known order; and
responsive to a user request, restoring data from the audit partition region to the respective set of locations on the storage device to return the storage device to a previous state.

32. The method of claim 31 wherein said defining step comprises the step of defining an audit header region and an audit buffer region.

33. The method of claim 32 wherein said storage device has a defined configuration and further comprising the step of storing information about the configuration of the audit buffer region in the audit header region.

34. The method of claim 32 and further comprising the step of storing event information relating to system events in the audit buffer region.

35. The method of claim 34 wherein said step of storing event information in the audit buffer region comprises storing audit markers, each audit marker comprising a marker header specify a type for the event and a time at which the event occurred and a marker trailer providing information for determining the location of the marker header. time which it occurred and a marker trailer providing information for determining the location of the marker header.

36. The method of claim 35 wherein said step of storing audit markers further comprises the step of storing the data to be altered in said marker header.

37. The method of claim 31 and further comprising the step of transferring data from the audit buffer to removable media.

38. The method of claim 37 wherein said transferring step comprises transferring data to said removable media responsive to a predetermined percentage of said audit buffer being full.

39. The method of claim 38 wherein said wherein said step of transferring data from the audit buffer further comprises transferring data from said audit buffer until a predetermined percentage of the audit buffer is available for new data.

40. The method of claim 31 and further comprises the step of transferring data from the audit buffer to the hard disk to return the hard disk to a previous state.

41. The method of claim 31 and further the steps of detecting system events and storing information regarding the events in the audit partition region.

42. The method of claim 41 and further comprising the step of generating a signal responsive to a detection of power applied to the computer system.

43. The method of claim 41 and further comprising the step of generating a signal responsive to detection of power failure to the system.

44. The method of claim 41 and further comprising the step of generating a signal responsive to a user input defining a desired state.

45. The method of claim 41 and further comprising the step of generating a signal responsive to a system reboot.

46. A method of providing rollback of data on a storage device comprising a plurality of locations to a previous desired state, comprising the steps of:
  detecting requests to write to the storage device;
  for each request:
    detecting a set of locations to which the request is directed;
    transferring data from said set of locations to an archival memory, such that a sequence of data transfers from the storage device is stored in the archival memory in a known order;
    writing the storage device responsive to the request, such that a copy of the data in said set of locations is stored in the archival memory after said set of locations is overwritten; and
  responsive to a user input, restoring data from the archival memory to the respective set of locations on the storage device to return the state of the storage device to a previous state.

* * * * *